F. MORRIS.
RESILIENT WHEEL.
APPLICATION FILED FEB. 21, 1911.
1,007,375.
Patented Oct. 31, 1911.
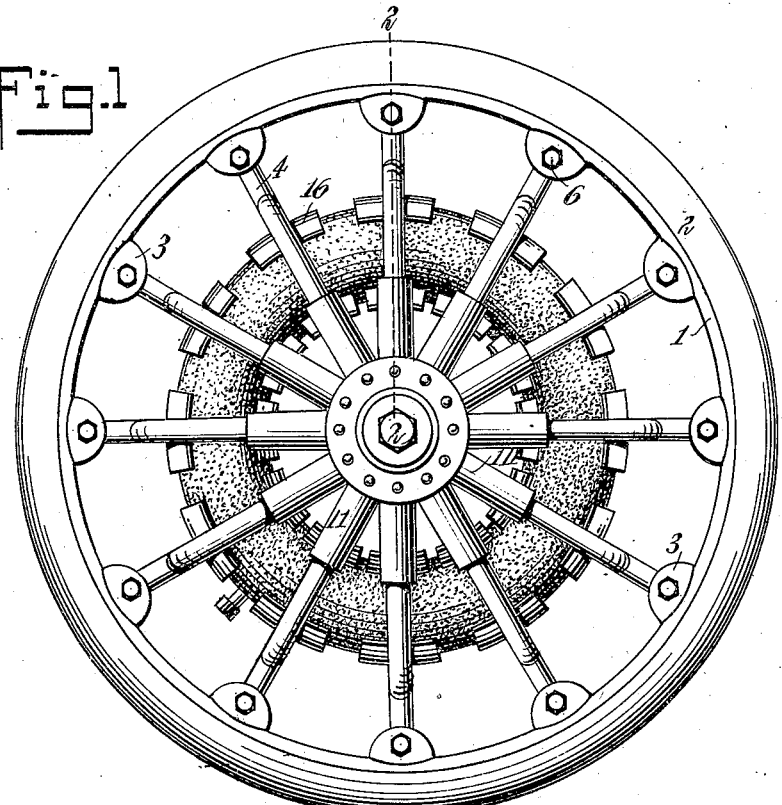
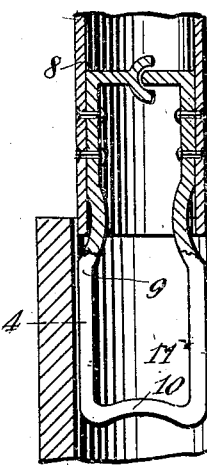
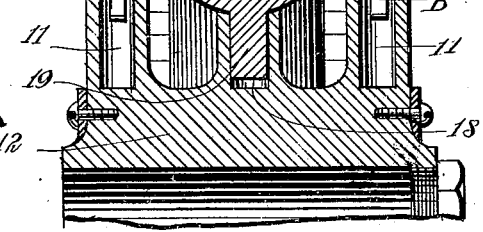
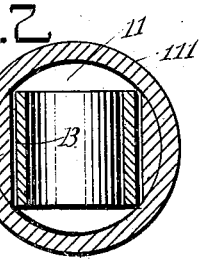
WITNESSES
John a Beighton
W. S. Orton
INVENTOR
Frank Morris
BY Munn & Co.
ATTORNEYS

UNITED STATES PATENT OFFICE.

FRANK MORRIS, OF OMAHA, NEBRASKA.

RESILIENT WHEEL.

1,007,375.   Specification of Letters Patent.   Patented Oct. 31, 1911.

Application filed February 21, 1911. Serial No. 609,882.

*To all whom it may concern:*

Be it known that I, FRANK MORRIS, a citizen of the United States, and a resident of Omaha, in the county of Douglas and State of Nebraska, have invented a new and Improved Resilient Wheel, of which the following is a full, clear, and exact description.

My invention relates to resilient vehicle wheels or combined cushion and pneumatic tire wheels.

An object of my invention is to provide a wheel which will have the same resiliency as an ordinary pneumatic tire wheel, but which is so constructed that the pneumatic tire does not come in contact with the ground and is thereby protected against puncture.

A further object of my invention is to simplify the construction of such wheels, so as to make them at the same time, cheap of manufacture and durable.

I attain the above-outlined objects by positioning the pneumatic tire between the rim and the hub, thereby protecting it from punctures.

With the above and other objects in view, as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming a part of this specification, in which similar characters of reference indicate corresponding parts in all the figures, and in which—

Figure 1 is a side elevation of my improved wheel; Fig. 2 is an enlarged transverse sectional view taken on the line 2—2 of Fig. 1; Fig. 3 is a detailed sectional view showing the spring means for connecting the spokes to the hub; and Fig. 4 is a transverse sectional view taken on the line 4—4 of Fig. 3.

In the drawings I have shown an outer metallic rim 1, carrying a solid rubber tire 2. Projecting radially inward from the inner periphery of the rim is a series of spaced-apart projecting lugs 3, each of which carries a Y-yoke 4, the stem 5 of which is pivoted between the projecting lugs 3 by means of a bolted connection 6. These yokes extend diametrically toward the center of the wheel with each pair of lugs arranged in a plane transversely across the wheel.

The inner end of each of the legs of the yoke is reduced to form a shoulder 7, and the reduced portion 8 has projecting therefrom a substantially rectangular spring member 9 having a closed end 10 projecting beyond the end of the reduced portion 8 and adapted to fit a pocket 11 centrally disposed within each of a series of tubes 111 extending radially from the hub 12 and positioned on opposite sides of a transverse medial plane passing through the wheel, as shown in Fig. 2. These springs 9 have a relatively broad flat bearing surface 13, which is adapted to fit against a flat-faced reinforcing strip 14 positioned on the longitudinally opposite sides of each of the pockets 11, as shown in Fig. 4. It will be seen that by this arrangement, there is afforded a spring connection between the hub and the rim which is reinforced to a considerable extent, thereby preventing relative torsion between the hub and the rim, and which will be disposed with the travel of the wheel.

Centrally disposed and projecting inwardly from the crotch 15 of the yoke 4 and in a line with the stem 5, is an arched foot piece 16 curved to fit the outside curved periphery of the pneumatic tire 17. Similarly, there is projected from the hub 13, intermediate the tubes 111, a series of outwardly-projecting pockets 18, carrying a Y-shaped foot member 19 projecting therefrom and conforming substantially to the construction of the foot member 16 and positioned opposite to the same, adapted to fit about and embrace the pneumatic tire 17.

It will be seen from this arrangement, that relative play may take place between the hub 12 and the outer rim 1 and its tire 2, due to the spring connection between the springs 9 and the pockets 11 on the hub 12. At the same time, any pressure upon the outside tire 2 is directly communicated to the pneumatic tire 17 which will take up any shock or strain upon the outer tire, and the resiliency of this inner pneumatic tire 17 will restore the outer rim to its normal position with reference to the hub.

Many changes could be made in the above construction and many apparently widely different embodiments of this invention could be made without departing from the scope thereof. It is intended that all matters contained herein, in the above description, or shown in the accompanying drawings, shall be interpreted as illustrative and not in a limiting sense. It is also to be understood that the language used in the following claims is merely intended to cover all the generic and specific features of the invention herein described and all statements of the scope of the invention, which, as a matter of language, might be said to fall therebetween, and that materials, sizes and relativities of parts are non-essential, except as called for in the claims.

Having thus described my invention, I claim as new and desire to secure by Letters Patent:

1. In a resilient wheel, a hub, a series of pockets radially disposed about said hub, a foot member disposed in each of said pockets, a pneumatic tire carried by said foot members, and an outer rim encircling said pneumatic tire, said rim being in spring engagement with said hub.

2. In a pneumatic wheel, a hub, a series of pockets radially disposed about said hub, said pockets arranged in pairs transversely of said hub, an outer rim, yoke members pivoted to said rim, means carried by the legs of said yoke members placing said legs in frictional engagement with said pockets, and resilient means interposed between said yoke and said hub, maintaining said members in their normal position.

3. In a resilient wheel having a hub, a series of pockets radially disposed about each end of said hub, a member having parts movable in a pair of said pockets in transverse alinement, an outer rim pivoted to said member, a solid tire carried by said outer rim, a series of pockets intermediate said first-named pockets, carrying members disposed in each of said pockets, and a resilient rim carried by said members to absorb shock on said solid rim.

In testimony thereof I have signed my name to this specification in the presence of two subscribing witnesses.

FRANK MORRIS.

Witnesses:
 Louis Stein,
 George E. Morris.

Copies of this patent may be obtained for five cents each, by addressing the "Commissioner of Patents, Washington, D. C."